(12) United States Patent
Shen

(10) Patent No.: US 11,386,717 B2
(45) Date of Patent: Jul. 12, 2022

(54) FINGERPRINT INPUTTING METHOD AND RELATED DEVICE

(71) Applicant: GUANGDONG OPPO MOBILE TELECOMMUNICATIONS CORP., LTD., Guangdong (CN)

(72) Inventor: Zeqi Shen, Guangdong (CN)

(73) Assignee: GUANGDONG OPPO MOBILE TELECOMMUNICATIONS CORP., LTD, Guangdong (CN)

( * ) Notice: Subject to any disclaimer, the term of this patent is extended or adjusted under 35 U.S.C. 154(b) by 0 days.

(21) Appl. No.: 17/378,497

(22) Filed: Jul. 16, 2021

(65) Prior Publication Data

US 2021/0342614 A1 Nov. 4, 2021

Related U.S. Application Data

(63) Continuation of application No. PCT/CN2020/070306, filed on Jan. 3, 2020.

(30) Foreign Application Priority Data

Jan. 30, 2019 (CN) .......................... 201910091870.7

(51) Int. Cl.
*G06V 40/50* (2022.01)
*G06V 40/60* (2022.01)
*G06V 40/13* (2022.01)

(52) U.S. Cl.
CPC .............. *G06V 40/50* (2022.01); *G06V 40/13* (2022.01); *G06V 40/67* (2022.01)

(58) Field of Classification Search
CPC ................... G06V 40/12–1394; G06V 40/50
See application file for complete search history.

(56) References Cited

U.S. PATENT DOCUMENTS 10,146,981 B2 * 12/2018 Sezan .................... G06V 40/13
10,482,309 B2 * 11/2019 Zhang .................... G06F 21/32
(Continued)

FOREIGN PATENT DOCUMENTS

CN 105045384 A 11/2015
CN 106203326 A 12/2016
(Continued)

OTHER PUBLICATIONS

International Search Report and the Written Opinion dated Apr. 2, 2020 from the International Searching Authority Re. Application No. PCT/CN2020/070306, 13 pages.

(Continued)

*Primary Examiner* — Patrick F Marinelli
(74) *Attorney, Agent, or Firm* — Adsero IP

(57) ABSTRACT

A fingerprint inputting method used in an electronic device that includes a display screen and an under-screen fingerprint module. The method includes: displaying a setting interface of fingerprint input having a button of adding fingerprint function; in response to detecting an instruction on the fingerprint adding function, obtaining at least one screen image by the under-screen fingerprint module while a user finger is not pressing a fingerprint identification region; displaying a guiding interface of fingerprint input on the display screen and obtaining a plurality of fingerprint images while the user finger is pressing the fingerprint identification region by the under-screen fingerprint module; and generating a fingerprint model according to the at least one screen image and the plurality of fingerprint images.

15 Claims, 8 Drawing Sheets

(56) References Cited

U.S. PATENT DOCUMENTS

| | | | |
|---|---|---|---|
| 10,572,749 B1* | 2/2020 | Bonev | G06V 40/13 |
| 10,667,218 B2* | 5/2020 | Zhang | G06F 1/3265 |
| 10,681,642 B2* | 6/2020 | Zhang | H04M 1/673 |
| 10,872,220 B2* | 12/2020 | Cho | G09G 3/3225 |
| 11,036,962 B2* | 6/2021 | Chen | G06V 40/50 |
| 11,256,792 B2* | 2/2022 | Tussy | H04W 12/06 |
| 2015/0074615 A1* | 3/2015 | Han | H04L 9/3231 |
| | | | 715/863 |
| 2015/0146945 A1* | 5/2015 | Han | G06F 3/04883 |
| | | | 382/125 |
| 2015/0235098 A1* | 8/2015 | Lee | G06V 40/13 |
| | | | 715/709 |
| 2016/0063298 A1* | 3/2016 | Tuneld | G06V 40/13 |
| | | | 348/77 |
| 2017/0039409 A1* | 2/2017 | Han | G06V 40/13 |
| 2017/0076132 A1* | 3/2017 | Sezan | G06F 21/32 |
| 2017/0091523 A1* | 3/2017 | Chen | G06V 40/13 |
| 2017/0147800 A1 | 5/2017 | Huang et al. | |
| 2018/0314874 A1* | 11/2018 | Yang | G06F 3/042 |
| 2019/0065808 A1* | 2/2019 | Zhang | G06F 3/04886 |
| 2019/0220647 A1* | 7/2019 | Han | H04L 63/0861 |
| 2019/0251393 A1* | 8/2019 | Jiang | G06V 40/1347 |
| 2020/0022084 A1* | 1/2020 | Zhang | G06F 21/32 |
| 2020/0022085 A1* | 1/2020 | Zhang | G06F 1/3218 |
| 2020/0082145 A1* | 3/2020 | Wang | G06F 3/0481 |
| 2021/0166047 A1* | 6/2021 | Juncker | G06V 40/1365 |
| 2021/0342614 A1* | 11/2021 | Shen | G06F 3/04182 |

FOREIGN PATENT DOCUMENTS

| | | |
|---|---|---|
| CN | 106446786 A | 2/2017 |
| CN | 107111763 A | 8/2017 |
| CN | 107656665 A | 2/2018 |
| CN | 108256415 A | 7/2018 |
| CN | 108762564 A | 11/2018 |
| CN | 109241859 A | 1/2019 |
| CN | 109241954 A | 1/2019 |
| CN | 109800731 A | 5/2019 |
| EP | 3101868 A1 | 12/2016 |
| WO | 2019009788 A1 | 1/2019 |

OTHER PUBLICATIONS

The First Office Action dated Jul. 1, 2020 from China Application No. 201910091870.7, 24 pages.

The Second Office Action dated Nov. 12, 2020 from China Application No. 201910091870.7, 30 pages.

Notice of Allowance dated Jan. 29, 2021 from China Application No. 201910091870.7, 4 pages.

Supplementary Search Report dated Mar. 1, 2022 From the Extended European search report(EESR) of the Application No. 20748191.2.

* cited by examiner

FINGERPRINT INPUTTING METHOD AND RELATED DEVICE

CROSS REFERENCE TO RELATED APPLICATION

This application is a continuation application of an International Application No. PCT/CN2020/070306, filed on Jan. 3, 2020, which claims priority to Chinese Application No. 201910091870.7, filed on Jan. 30, 2019. The entire disclosures of the above applications are incorporated herein by reference.

FIELD OF THE DISCLOSURE

The present disclosure relates to an electronic device, and more particularly, to a fingerprint inputting method and a related device.

BACKGROUND

In the conventional under-screen fingerprint inputting solution in an electronic device (such as a cell phone), the inputting process is basically identical to the traditional capacitor-type fingerprint inputting process. That is, the user needs to use his finger to press the screen for several times for capturing the pictures of the fingerprint such that the fingerprint model could be established and recorded in the system. Because the under-screen fingerprint inputting process requires the user's finger to press the fingerprint identification region, the cleanness of the screen affects the accuracy of fingerprint inputting process and further affects the false rejection rate (FRR) of the fingerprint identification process.

SUMMARY OF DISCLOSURE

One objective of an embodiment of the present disclosure is to provide a fingerprint inputting method and a related device to improve the accuracy of fingerprint inputting process and reduce the false rejection rate (ERR) of the fingerprint identification process.

According to a first aspect of the present disclosure, a fingerprint inputting method for an electronic device is disclosed. The fingerprint inputting method includes: displaying a setting interface of fingerprint input on a display screen, wherein the setting interface of fingerprint input comprises a button of adding fingerprint function; in response to detecting an instruction on the button of adding fingerprint function, obtaining at least one screen image by the under-screen fingerprint module while a user finger is not pressing a fingerprint identification region, wherein the fingerprint identification region comprises a predetermined region; displaying a guiding interface of fingerprint input on the display screen and obtaining a plurality of fingerprint images Chile the user finger is pressing the fingerprint identification region by the under-screen fingerprint module; and generating a fingerprint model according to the at least one screen image and the plurality of fingerprint images.

Still another aspect of the present disclosure provides an electronic device comprising a display screen, an under-screen fingerprint module, a processor, and a memory. The display screen is configured to display a setting interface for fingerprint input comprising a button of adding fingerprint function and to display a guiding interface of fingerprint input. The under-screen fingerprint module corresponding to a predetermined region of the display screen is configured to obtain at least one screen image while a user finger not pressing a fingerprint identification region in response to detecting an instruction on the button of adding fingerprint function, and configured to obtain a plurality of fingerprint images while the user finger is pressing the fingerprint identification region. The fingerprint identification region comprises the predetermined region. The memory stores one or more programs executable by the processor to perform at least one operation that comprises generating a fingerprint model according to the at least one screen image and the plurality of fingerprint images.

Still another aspect of the present disclosure provides a non-transitory computer readable storage medium storing computer procedures for electronic data interchange. The computer procedures are executable by a computer to perform at least one operation comprising: generating a fingerprint model according to at least one screen image and a plurality of fingerprint images. The at least one screen image is obtained by an under-screen fingerprint module while a user finger is not pressing a fingerprint identification region in response to detecting an instruction on a button of adding fingerprint function that is displayed on a display screen of the computer. A plurality of fingerprint images are obtained by the under-screen fingerprint module while the user finger is pressing a fingerprint identification region of the display screen. The fingerprint identification region corresponds to the under-screen fingerprint module.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION

Figure 1:
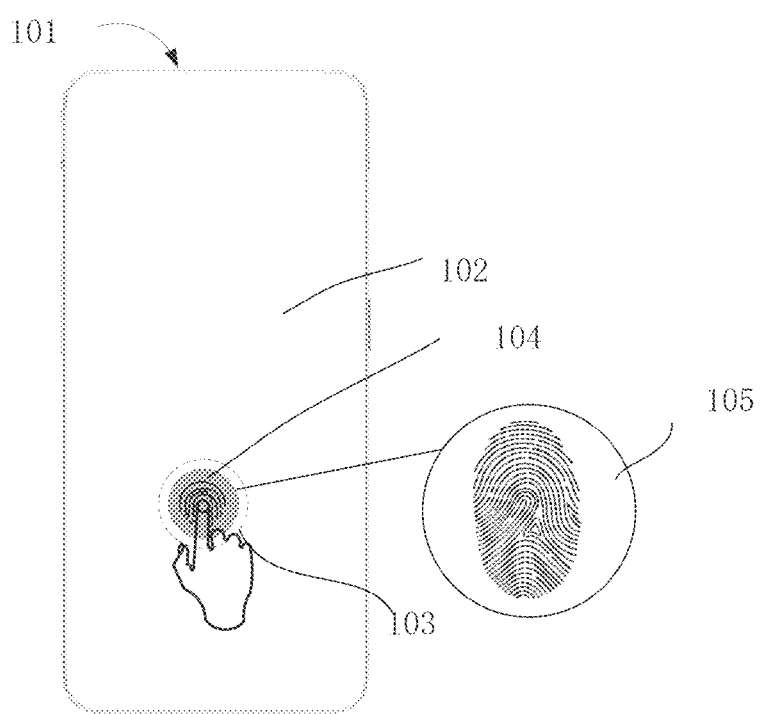
FIG. 1 is a diagram of an electronic device that could obtain a fingerprint according to an embodiment of the present disclosure.

The fingerprint identification technique identifies a person by his fingerprint. By comparing his fingerprint with a pre-stored fingerprint (for example, a certain fingerprint could be identified from the detail characteristics of different fingerprints), the identify of the person could be determined. The minutiae represent that the fingerprint grain has interrupts, bifurcates, or turning points, which make the fingerprint unique. The fingerprint grain of each person has its unique pattern, interrupts, bifurcates, or turning points. This uniqueness remains in his whole life. Based on this uniqueness and stableness, the fingerprint identification technique could be created. The fingerprint identification has advantages of fast identification speed, low cost and easy collection and is thus widely used in the image processing, mode identification, computer visual fields. Please refer to FIG. 1. FIG. 1 is a diagram of an electronic device 101 that could obtain a fingerprint according to an embodiment of the present disclosure. The electronic device 101 comprises a display screen 102, and an under-screen fingerprint module 104 positioned correspondingly to the predetermined region of the display screen 102. Picture 105 is an enlarged fingerprint. When the user finger touches the screen, the light generated by the display screen 102 pass through the cover plate to eliminate the fingerprint grain to form a fingerprint light film. The fingerprint sends the reflected light to the fingerprint module to form a fingerprint image. In this embodiment, the electronic device could be any electronic device having an under-screen fingerprint module. The electronic device could comprise any portable device, automotive device, wearable device or other processing devices connected to the wireless modulator/demodulator, which have wireless communication function and any other forms of user equipments (UE), mobile stations (MS), and terminal devices.

Conventionally, if the display screen has dirty stuffs or objects on it, these objects may be regarded as the fingerprint information and collected in the fingerprint model. In this way, after the dirty stuffs or objects are removed, the false rejection rate (FRR) apparently raises in the fingerprint identification process. Therefore, an embodiment of the present disclosure provides a fingerprint inputting method to solve the above issue and will be illustrated below.

Figure 2A:
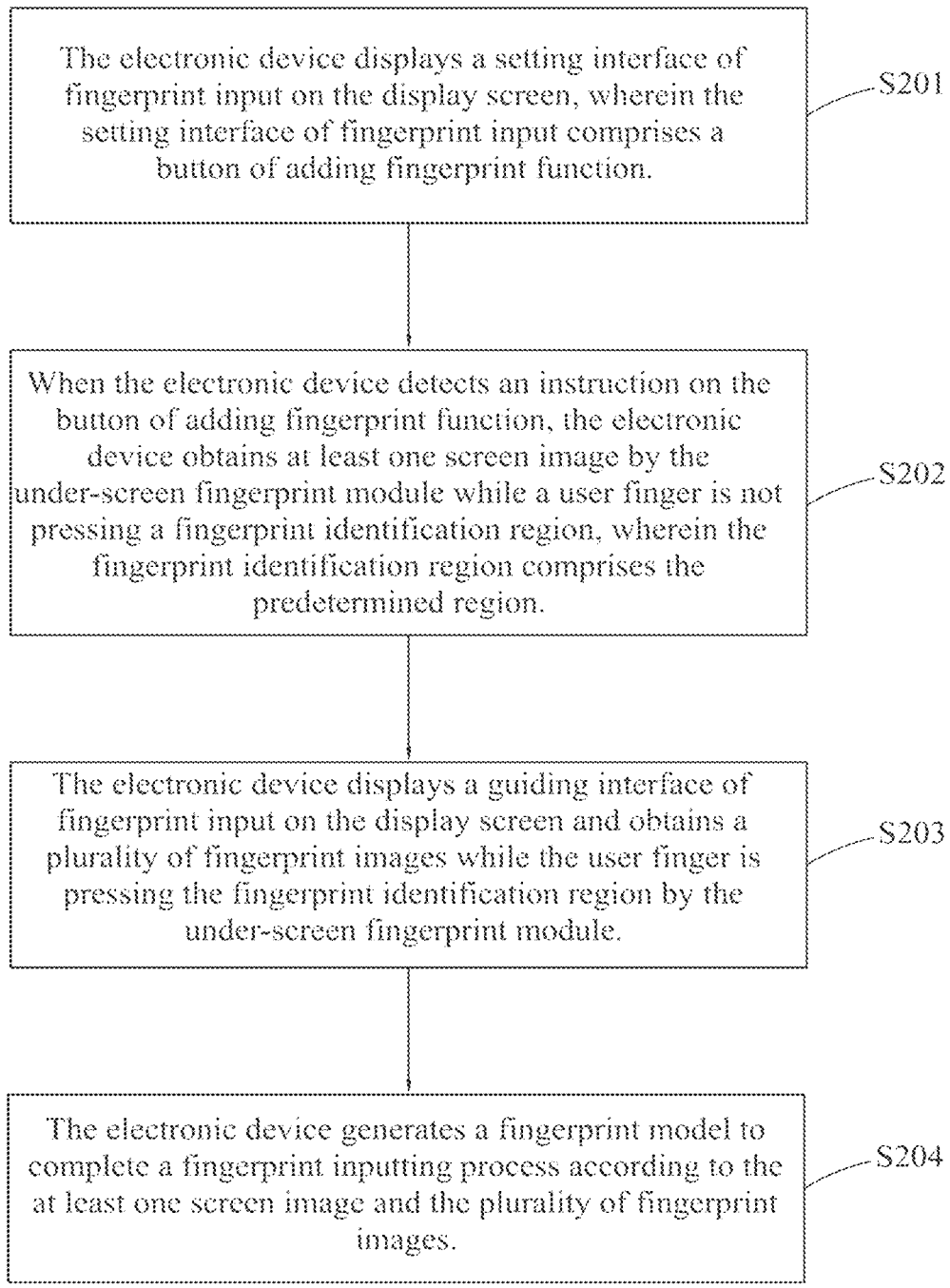
FIG. 2a is a flow chart of a fingerprint inputting method according to an embodiment of the present disclosure.

Please refer to FIG. 2a. FIG. 2a is a flow chart of a fingerprint inputting method according to an embodiment of the present disclosure. The fingerprint inputting method is used in an electronic device. The electronic device comprises display screen and an under-screen fingerprint module corresponding to a predetermined region of the display screen. The fingerprint inputting method comprises:

S201: The electronic device displays a setting interface of fingerprint input on the display screen, wherein the setting interface for fingerprint input comprises a button of adding fingerprint function.

Figure 2B:
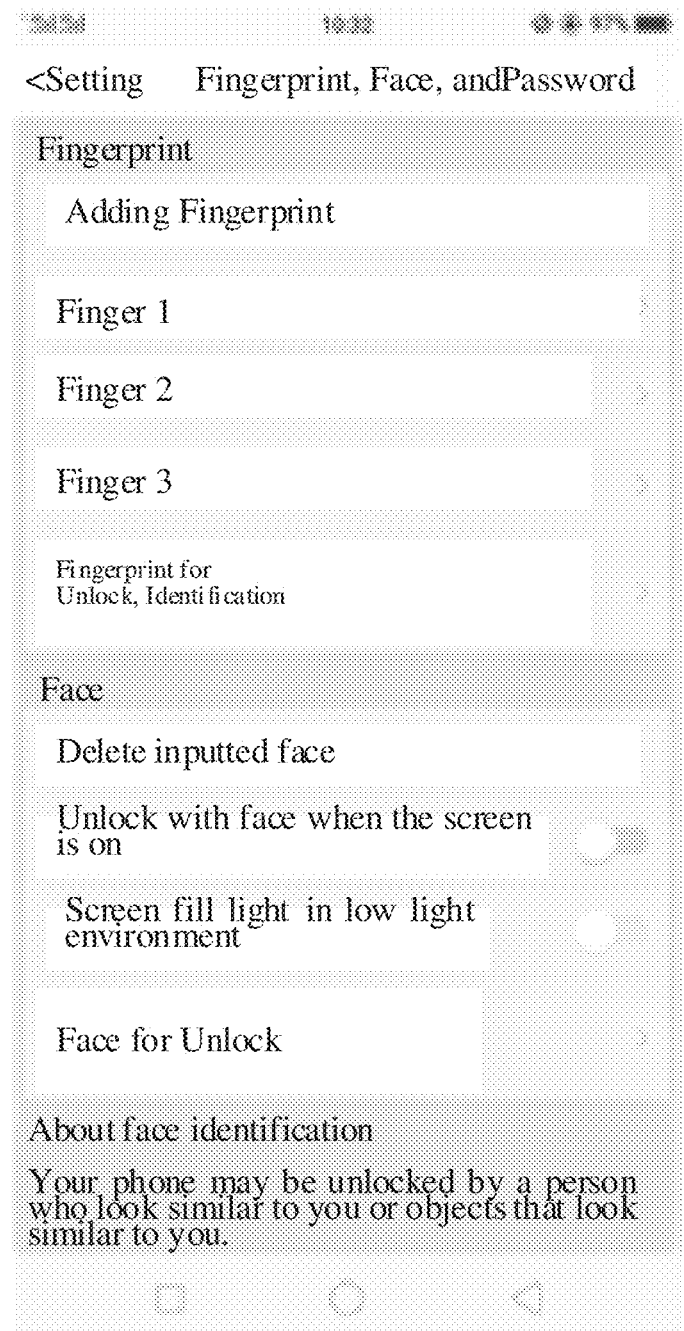
FIG. 2b is a diagram of a fingerprint setting interface according to an embodiment of the present disclosure.

As shown in FIG. 2b, the setting interface for fingerprint input comprises a fingerprint setting region and a face setting region. Here, the button of adding fingerprint function is displayed in the fingerprint setting region.

S202: When the electronic device detects an instruction on the button of adding fingerprint function, the electronic device obtains at least one screen image by the under-screen fingerprint module while a user finger is not pressing a fingerprint identification region, wherein the fingerprint identification region comprises the predetermined region.

If the electronic device does not detect that the fingerprint identification is pressed in a predetermined time period (such as 100 ms), the electronic device could obtain one or multiple screen images. Then, the electronic device highlights the fingerprint identification region to inform the user of the location to perform a fingerprint inputting.

Here, the projection of the predetermined region on the sampling end of the under-screen fingerprint module overlaps with the sampling end. The fingerprint identification region could be in a shape of round, square or any other irregular shapes. This is not a limitation of the present disclosure.

S203: The electronic device displays a guiding interface of fingerprint input on the display screen and obtains a plurality of fingerprint images while the user finger is pressing the fingerprint identification region by the under-screen fingerprint module.

The step performed by the electronic device to obtain a plurality of fingerprint images while the user finger is pressing the fingerprint identification region by the under-screen fingerprint module could be: the electronic device sequentially displays, in the guiding interface of fingerprint input, a plurality of gesture guiding information in a predetermined guiding information set and obtains at least one fingerprint image while the user finger is pressing the fingerprint identification region during a display process of each of the gesture guiding information by the under-screen fingerprint module to obtain the plurality of fingerprint images.

The guiding information set could comprise predetermined posture informing information for informing a user to press the fingerprint identification region by different finger postures. Here, the posture informing information comprises image and/or text information. This is not a limitation of the present disclosure.

In this embodiment, the electronic device accurately guides the user to efficiently input a plurality of fingerprint images by the guiding interface and thus raises the fingerprint inputting efficiency and accuracy.

The method further comprises: the electronic device could determine the position of noise factors according to the screen image and output informing information to inform the user to clean the display screen and to inform the user to normally input the fingerprint after determining that there is no noise factor by repeating checking the screen images. In this case, the electronic device could use interactive informing method to guide the user to clean the noise factors on the display screen and thus raise the fingerprint inputting efficiency and accuracy.

S204: The electronic device generates a fingerprint model to complete a fingerprint inputting process according to the at least one screen image and the plurality of fingerprint images.

The fingerprint model is used as basic information for identifying the identity of the user. The fingerprint model could be data having basic fingerprint information of the user finger.

The implementation of the block S204 could be various and not a limitation of the present disclosure.

The above-mentioned at least one screen image comprises a plurality of screen images. The step performed by the electronic device to generate the fingerprint model to complete the fingerprint inputting process according to the at least one screen image and the plurality of fingerprint images comprises: the electronic device generates a reference image for filtering out a noise factor according to the at least one screen image, wherein the noise factor comprises a non-fingerprint information of the predetermined region and the non-fingerprint information comprises at least one of a dirty stain and a foreign object; and the electronic device obtains a reference fingerprint image by filtering out a noise factor from each of the plurality of fingerprint images according to the reference image; and the electronic device generates the fingerprint model according to a fingerprint model algorithm and a plurality of the reference fingerprint images.

The electronic device processes the plurality of screen images to obtain the reference image. The reference image could truly reflect the non-fingerprint information, such as dirty stains or foreign objects.

The fingerprint model algorithm could be various and is not a limitation of the present disclosure. For example, the fingerprint model algorithm could be image stitching or characteristic accumulation algorithms.

In addition, the electronic device could dynamically adjust the sampling number of the screen images according to the instruction on the fingerprint adding function and the time period between two times when the user finger presses the screen. This could raise the accuracy and stability.

In an embodiment, the electronic device could obtain a plurality of screen images before the user presses the screen to determine the status of the screen such that the noise factor of the screen could be calculated. In this way, the electronic device could filter out the noise factor during the process of obtaining the fingerprint such that the accuracy of fingerprint inputting could be raised.

In another embodiment, the at least one screen image comprises only one screen image. The step performed by the electronic device to generate the fingerprint model to complete the fingerprint inputting process according to the at least one screen image and the plurality of fingerprint images comprises: the electronic device determines a reference image for filtering out a non-fingerprint information of the predetermined region and the non-fingerprint information comprises at least one of a dirty stain and a foreign object; the electronic device obtains a reference fingerprint image by filtering out a noise factor from each of the plurality of fingerprint images according to the reference image; and the electronic device generates the fingerprint model according to a fingerprint model algorithm and a plurality of the reference fingerprint images.

The above-mentioned only one screen image is obtained when the electronic devices highlights/does not highlight the fingerprint identification region.

In an embodiment, before the user presses the screen, the electronic device could obtain a single screen image to accurately determine the status of the screen and accurately calculate the noise factor of the screen. In this way, the electronic device could filter out the noise factor in the fingerprint obtaining process to raise the fingerprint inputting accuracy and efficiency.

The step performed by the electronic device to generate the fingerprint model according to the fingerprint model algorithm and the plurality of the reference fingerprint images comprises: the electronic device obtains a minutiae information from the plurality of reference fingerprint images; the electronic device obtains standard minutiae data by processing the minutiae information by an algorithm of obtaining minutiae; and the electronic device generates the fingerprint model according to the standard minutiae data.

The minutiae information of the fingerprint comprises the direction, curve rate, positions of the termination point, bifurcated point, sole point, ring point, short grain and other detailed characteristic points of the fingerprint grain. The standard minutiae data are the fingerprint minutiae data formed according to a predetermined format. The fingerprint model is a data set comprising the fingerprint art and all the minutiae data.

In this embodiment, after obtaining a plurality of reference fingerprint images, where the noise factor is filtered out, the electronic device could extract the characteristic point of each image and obtain the fingerprint model according to the predetermined fingerprint characteristic extracting algorithm. This could raise the accuracy and the efficiency of generating the fingerprint model.

In the above embodiment, the step performed by the electronic device to generate the fingerprint model according to the fingerprint model algorithm and the plurality of the reference fingerprint images comprises: the electronic device divides the plurality of reference fingerprint images into a plurality of image sets, wherein each image set comprises a reference fingerprint image or at least two reference fingerprint images, a similarity between the at least two reference fingerprint images is greater than a first predetermined threshold, and a similarity between two reference fingerprint images in two image sets is smaller than a first predetermined threshold. The above step further comprises: the electronic device deletes at least one duplicated image from the plurality of image sets such that each of the plurality of image sets only has one reference fingerprint image; the electronic device obtains minutiae information from the reference fingerprint image retained in each of the plurality of image sets; the electronic device generates standard minutiae data according to the minutiae information corresponding to the plurality of image sets; and the electronic device generates the fingerprint model according to the standard minutiae data.

In this case, based on repeatedly obtained fingerprint images, the electronic device could quickly determine a candidate fingerprint image by dividing mechanism and redundancy removing mechanism and obtain the minutiae information of the fingerprint image to generate the fingerprint model. This improves the efficiency and accuracy of the finger model inputting.

The step performed by the electronic device to obtain the reference fingerprint image by filtering out the noise factor from each of the plurality of fingerprint images according to the reference image comprises: the electronic device performs an image characteristic comparison between the reference image and each of the fingerprint images to determine a noise image characteristic and a background image characteristic; and the electronic device obtains the reference fingerprint image by updating each of the fingerprint images according to the noise image characteristic and the background image characteristic.

Figure 2C:
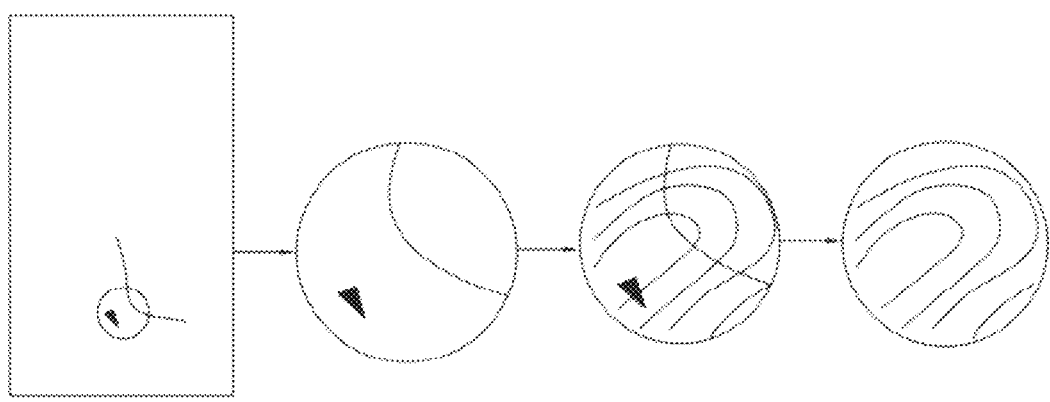
FIG. 2c is a diagram of a picture capturing effect according to an embodiment of the present disclosure.

As the obtaining process shown in FIG. 2c, the electronic device could compare the screen image and the fingerprint image to extract the background image characteristics and noise image characteristics and could directly use only one fingerprint image characteristic or an average of multiple fingerprint image characteristics around the noise image characteristics to update the noise image characteristics.

In this embodiment, the electronic device could update the noise factors and quickly execute the noise filtering of the fingerprint image by characteristic comparison. This improves the fingerprint inputting efficiency.

According to the embodiment of the present disclosure, the electronic device comprising a display screen and an under-screen fingerprint module corresponding to a predetermined region of the display screen. The electronic device first displays a setting interface for fingerprint input on the display screen, wherein the setting interface for fingerprint input comprises a button of adding fingerprint function. Then, the electronic device, in response to detecting an instruction on the button of adding fingerprint function, obtains at least one screen image by the under-screen fingerprint module while a user finger is not pressing a fingerprint identification region, wherein the fingerprint identification region comprises the predetermined region. And then, the electronic device displays a guiding interface of fingerprint input on the display screen and obtains a plurality of fingerprint images while the user finger is pressing the fingerprint identification region by the under-screen fingerprint module. Finally, the electronic device generates a fingerprint model to complete a fingerprint inputting process according to the at least one screen image and the plurality of fingerprint images. From the above, it could be understood that the electronic device could collect the screen images when the user finger does not press the fingerprint identification region and merges later-collected multiple fingerprint images to generate the fingerprint model. Because the real-time collected screen images could truly reflect the cleanness of the screen during the fingerprint inputting process, the electronic device could filter out the noise factor through the screen images. In this way, the electronic device could have a better accuracy of fingerprint inputting process and reduce the FRR of the fingerprint identification.

Figure 3:
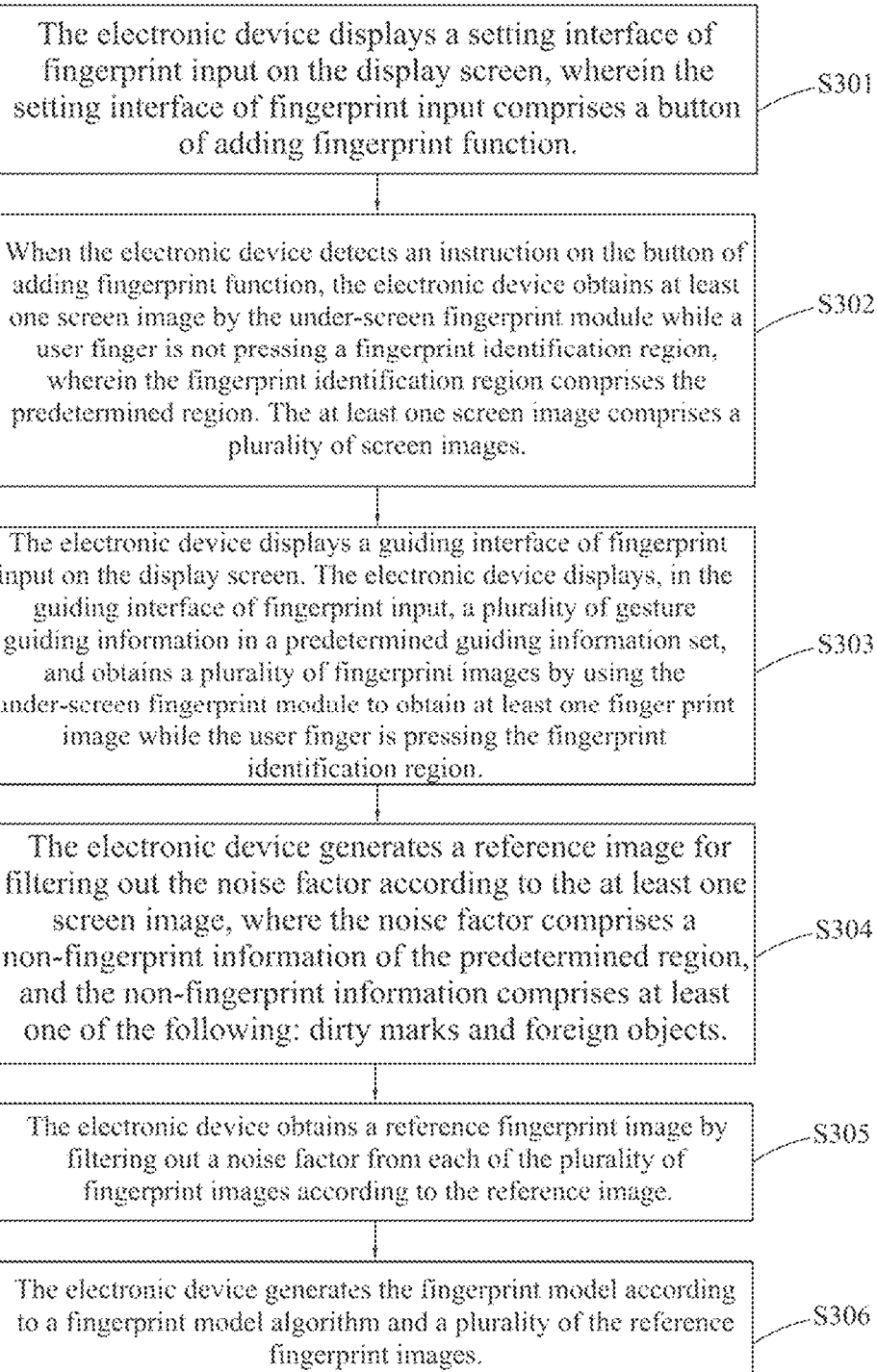
FIG. 3 is a flow chart of a fingerprint inputting method according to another embodiment of the present disclosure.

Please refer to FIG. 3. FIG. 3 is a flow chart of a fingerprint inputting method according to another embodiment of the present disclosure. The fingerprint inputting method is used in the electronic device shown in FIG. 1. The electronic device comprises a display screen and an under-screen fingerprint module corresponding to a predetermined region corresponding to the display screen. The fingerprint inputting method comprises:

S301: The electronic device displays a setting interface for fingerprint input on the display screen, wherein the setting interface for fingerprint input comprises a button of adding fingerprint function.

S302: When the electronic device detects an instruction on the button of adding fingerprint function, the electronic device obtains at least one screen image by the under-screen fingerprint nodule while a user finger is not pressing a fingerprint identification region, wherein the fingerprint identification region comprises the predetermined region. The at least one screen image comprises a plurality of screen images.

S303: The electronic device displays a guiding interface of fingerprint input on the display screen; sequentially displays, in the guiding interface of fingerprint input, a plurality of gesture guiding information in a predetermined guiding information set; and obtains a plurality of fingerprint images by using the under-screen fingerprint module to obtain at least one finger print image while the user finger is pressing the fingerprint identification region.

S304: The electronic device generates a reference image for filtering out the noise factor according to the at least one screen image. The noise factor comprises a non-fingerprint information of the predetermined region. The non-fingerprint information comprises at least one of the following: dirty stains and foreign objects.

S305: The electronic device obtains a reference fingerprint image by filtering out a noise factor from each of the plurality of fingerprint images according to the reference image.

S306: The electronic device generates the fingerprint model according to a fingerprint model algorithm and a plurality of the reference fingerprint images.

According to the embodiment of the present disclosure, the electronic device comprising a display screen and an under-screen fingerprint module corresponding to a predetermined region of the display screen. The electronic device first displays a setting interface for fingerprint input on the display screen, wherein the setting interface for fingerprint input comprises a button of adding fingerprint function. Then, the electronic device, in response to detecting an instruction on the button of adding fingerprint function, obtains at least one screen image by the under-screen fingerprint module while a user finger is not pressing a fingerprint identification region, wherein the fingerprint identification region comprises the predetermined region. And then, the electronic device displays a guiding interface of fingerprint input, on the display screen and obtains a plurality of fingerprint images while the user finger is pressing the fingerprint identification region by the under-screen fingerprint module. Finally, the electronic device generates a fingerprint model to complete a fingerprint inputting process according to the at least one screen image and the plurality of fingerprint images. From the above, it could be understood that the electronic device could collect the screen images when the user finger does not press the fingerprint identification region and merges later-collected multiple fingerprint images to generate the fingerprint model Because the real-time collected screen images could truly reflect the cleanness of the screen during the fingerprint inputting process, the electronic device could filter out the noise factor through the screen images. In this way, the electronic device could have a better accuracy of fingerprint inputting process and reduce the FRR of the fingerprint identification.

In addition, before the user presses the screen, the electronic device could obtain a plurality of screen images to determine the status of the screen such that the noise factor of the screen could be accurately calculated. Then, the noise factor is filtered out during the process of obtaining the fingerprint images such that the fingerprint inputting accuracy could be raised.

Figure 4:
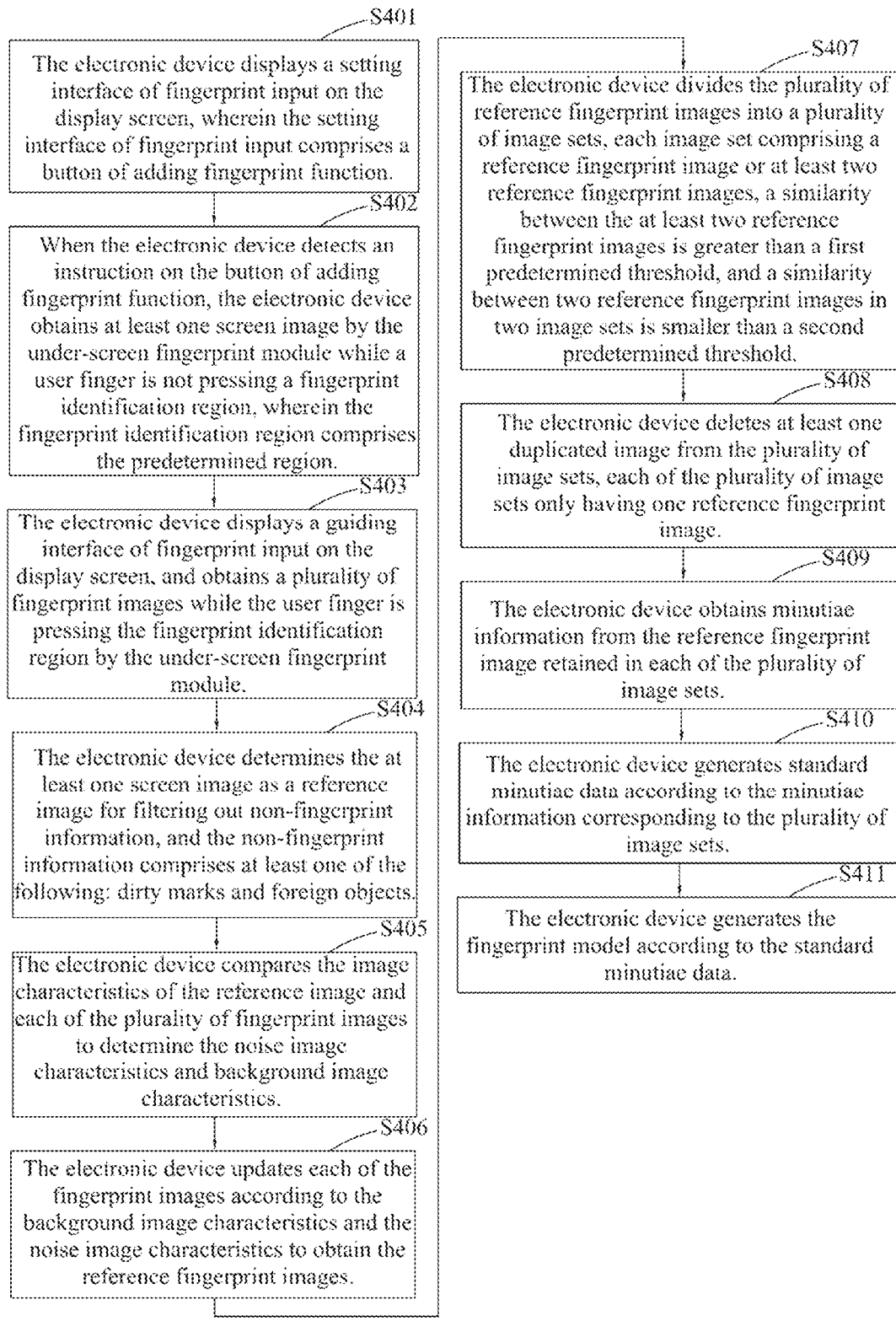
FIG. 4 is a flow chart of a fingerprint inputting method according to another embodiment of the present disclosure.

Please refer to FIG. 4. FIG. 4 is a flow chart of a fingerprint inputting method according to another embodiment of the present disclosure. The fingerprint inputting method is used in an electronic device The electronic device comprises a display screen and an under-screen fingerprint module corresponding to a predetermined region corresponding to the display screen. The fingerprint inputting method comprises:

S401: The electronic device displays a setting interface for fingerprint input on the display screen. The setting interface for fingerprint input comprises a button of adding fingerprint function.

S402: When the electronic device detects an instruction on the button of adding fingerprint function, the electronic device obtains at least one screen image by the under-screen fingerprint module while a user finger is not pressing a fingerprint identification region, wherein the fingerprint identification region comprises the predetermined region.

S403: The electronic device displays a guiding interface of fingerprint input on the display screen, and obtains a plurality of fingerprint images while the user finger is pressing the fingerprint identification region by the under-screen fingerprint module.

S404: The electronic device determines the at least one screen image as a reference image for filtering out non-fingerprint information. The non-fingerprint information comprises at least one of the following: dirty stains and foreign objects.

S405: The electronic device compares the image characteristics of the reference image and each of the plurality of fingerprint images to determine the noise image characteristics and background image characteristics.

S406: The electronic device updates each of the fingerprint images according to the background image characteristics and the noise image characteristics to obtain the reference fingerprint images.

S407: The electronic device divides the plurality of reference fingerprint images into a plurality of image sets, each image set comprising a reference fingerprint image or at least two reference fingerprint images, a similarity between the at least two reference fingerprint images is greater than a first predetermined threshold, and a similarity between two reference fingerprint images in two image sets is smaller than a first predetermined threshold.

S408: The electronic device deletes at least one duplicated image from the plurality of image sets such that each of the plurality of image sets only has one reference fingerprint image.

S409: The electronic device obtains minutiae information from the reference fingerprint image retained in each of the plurality of image sets.

S410: The electronic device generates standard minutiae data according to the minutiae information corresponding to the plurality of image sets.

S411: The electronic device generates the fingerprint model according to the standard minutiae data.

According to the embodiment of the present disclosure, the electronic device comprising a display screen and an under-screen fingerprint module corresponding to a predetermined region of the display screen. The electronic device first displays a setting interface for fingerprint input on the display screen, wherein the setting interface for fingerprint input comprises a button of adding fingerprint function. Then, the electronic device, in response to detecting an instruction on the button of adding fingerprint function, obtains at least one screen image by the under-screen fingerprint module while a user finger is not pressing a fingerprint identification region, wherein the fingerprint identification region comprises the predetermined region. And then, the electronic device displays a guiding interface of fingerprint input on the display screen and obtains a plurality of fingerprint images while the user finger is pressing the fingerprint identification region by the under-screen fingerprint module. Finally, the electronic device generates a fingerprint model to complete a fingerprint inputting process according to the at least one screen image and the plurality of fingerprint images. From the above, it could be understood that the electronic device could collect the screen images when the user finger does not press the fingerprint identification region and merges later-collected multiple fingerprint images to generate the fingerprint model. Because the real-time collected screen images could truly reflect the cleanness of the screen during the fingerprint inputting process, the electronic device could filter out the noise factor through the screen images. In this way, the electronic device could have a better accuracy of fingerprint inputting process and reduce the FRR of the fingerprint identification.

In addition, before the user presses the screen, the electronic device could obtain a single screen image to determine the status of the screen such that the noise factor of the screen could be accurately calculated. Then, the noise factor is filtered out during the process of obtaining the fingerprint ages such that the fingerprint inputting accuracy could be raised.

Figure 5:
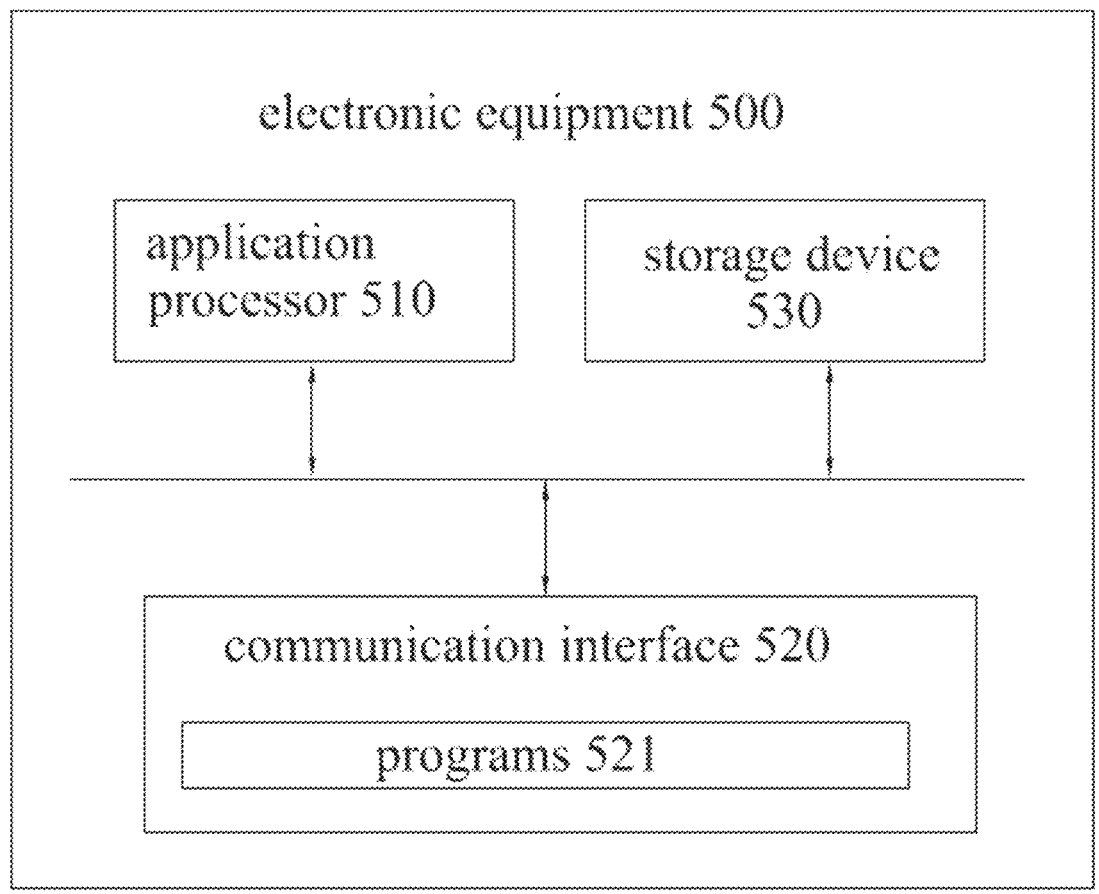
FIG. 5 is a diagram of a structure of an electronic device according to an embodiment of the present disclosure.

Consistent with the embodiments shown in FIG. 2a, FIG. 3 and FIG. 4, please refer to FIG. 5. FIG. 5 is a diagram of a structure of an electronic device according to an embodiment of the present disclosure. As shown in FIG. 5, the electronic device 500 comprises a display screen and an under-screen fingerprint module corresponding to a predetermined region corresponding to the display screen. In addition, the electronic device 500 further comprises an application processor 510, a storage device 520, a communication interface 530 and one or multiple programs 521.

The one or multiple programs 521 are stored in the storage device 520 and executed by the application processor 510 to perform operations comprising:

displaying a setting interface for fingerprint input on the display screen, wherein the setting interface for fingerprint input comprises a button of adding fingerprint function;

in response to detecting an instruction on the button of adding fingerprint function obtaining at least one screen image by the under-screen fingerprint module while a user finger is not pressing a fingerprint identification region, wherein the fingerprint identification region comprises the predetermined region;

displaying a guiding interface of fingerprint input on the display screen and obtaining a plurality of fingerprint images while the user finger is pressing the fingerprint identification region by the under-screen fingerprint module; and generating a fingerprint model to complete a fingerprint inputting process according to the at least one screen image and the plurality of fingerprint images.

According to the embodiment of the present disclosure, the electronic device comprising a display screen and an under-screen fingerprint module corresponding to a predetermined region of the display screen. The electronic device first displays a setting interface for fingerprint input on the display screen, wherein the setting interface for fingerprint input comprises a button of adding fingerprint function. Then, the electronic device, in response to detecting an instruction on the button of adding fingerprint function, obtains at least one screen image by the under-screen fingerprint module while a user finger is not pressing a fingerprint identification region, wherein the fingerprint identification region comprises the predetermined region. And then, the electronic device displays a guiding interface of fingerprint input on the display screen and obtains a plurality of fingerprint images while the user finger is pressing the fingerprint identification region by the under-screen fingerprint module. Finally, the electronic device generates a fingerprint model to complete a fingerprint inputting process according to the at least one screen image and the plurality of fingerprint images. From the above, it could be understood that the electronic device could collect the screen images when the user finger does not press the fingerprint identification region and merges later-collected multiple fingerprint images to generate the fingerprint model. Because the real-time collected screen images could truly reflect the cleanness of the screen during the fingerprint inputting process, the electronic device could filter out the noise factor through the screen images. In this way, the electronic device could have a better accuracy of fingerprint inputting process and reduce the FRR of the fingerprint identification.

According to the above embodiment of the present disclosure, the at least one screen image comprises a plurality of screen images and the operation of generating the fingerprint model to complete the fingerprint inputting process according to the at least one screen image and the plurality of fingerprint images comprises: generating a reference image for filtering out a noise factor according to the at least one screen image, wherein the noise factor comprises a non-fingerprint information of the predetermined region and the non-fingerprint information comprises at least one of a dirty stain and a foreign object; obtaining a reference fingerprint image by filtering out a noise factor from each of the plurality of fingerprint images according to the reference image; and generating the fingerprint model according to a fingerprint model algorithm and a plurality of the reference fingerprint images.

According to the above embodiment of the present disclosure, the at least one screen image comprises only one screen image and the operation of generating the fingerprint model to complete the fingerprint inputting process according to the at least one screen image and the plurality of fingerprint images comprises: determining a reference image for filtering out a non-fingerprint information of the predetermined region and the non-fingerprint information comprises at least one of a dirty stain and a foreign object; obtaining a reference fingerprint image by filtering out a noise factor from each of the plurality of fingerprint images according to the reference image; and generating the fingerprint model according to a fingerprint model algorithm and a plurality of the reference fingerprint images.

According to the above embodiment of the present disclosure, the operation of generating the fingerprint model according to the fingerprint model algorithm and the plurality of the reference fingerprint images comprises: obtaining a minutiae information from the plurality of reference fingerprint images; Obtaining standard minutiae data by processing the minutiae information by an algorithm of obtaining minutiae; and generating the fingerprint model according to the standard minutiae data.

According to the above embodiment of the present disclosure, the operation of generating the fingerprint model according to the fingerprint model algorithm and the plurality of the reference fingerprint images comprises: dividing the plurality of reference fingerprint images into a plurality of image sets, each image set comprising a reference fingerprint image or at least two reference fingerprint images, a similarity between the at least two reference fingerprint images is greater than a first predetermined threshold, a similarity between two reference fingerprint images in two image sets is smaller than a first predetermined threshold; deleting at least one duplicated image from the plurality of image sets such that each of the plurality of image sets only has one reference fingerprint image; obtaining minutiae information from the reference fingerprint image retained in each of the plurality of image sets; generating standard minutiae data according to the minutiae information corresponding to the plurality of image sets; and generating the fingerprint model according to the standard minutiae data.

According to the above embodiment of the present disclosure, the operation of obtaining the reference fingerprint image by filtering out the noise factor from each of the plurality of fingerprint images according to the reference image comprises: performing an image characteristic comparison between the reference image and each of the fingerprint images to determine a noise image characteristic and a background image characteristic; and obtaining the reference fingerprint image by updating each of the fingerprint images according to the noise image characteristic and the background image characteristic.

According to the above embodiment of the present disclosure, the operation of obtaining the plurality of fingerprint images while the user finger is pressing the fingerprint identification region by the under-screen fingerprint module comprises: sequentially displaying, in the guiding interface of fingerprint input, a plurality of gesture guiding information in a predetermined guiding information set and obtaining at least one fingerprint image while the user finger is pressing the fingerprint identification region during a display process of each of the gesture guiding information by the under-screen fingerprint module to obtain the plurality of fingerprint images.

The above embodiments of the present disclosure are introduced from the perspective of the execution process on the method side. It can be understood that, in order to implement the above-mentioned functions, an electronic device includes hardware structures and/or software modules corresponding to each function. Those skilled in the art should easily realize that in combination with the units and algorithm steps of the examples described in the embodiments provided herein, the present application can be implemented in the form of hardware or a combination of hardware and computer software. Whether a certain function is executed by hardware or is performed by hardware driven by computer software depends on the specific application and design constraint conditions of the technical solution. Professionals and technicians can use different methods for each specific application to realize the described functions, but this realization should not be considered beyond the scope of this disclosure.

The embodiment of the present disclosure may divide the electronic device into functional units according to the foregoing method examples. For example, each functional unit may be divided corresponding to each function, or two or more functions may be integrated into one processing unit. The above-mentioned integrated unit can be implemented in the form of hardware or software functional unit. It should be noted that the division of units in the embodiments of the present disclosure is illustrative, and is only a logical function division, and there may be other division methods in actual implementation.

Figure 6:
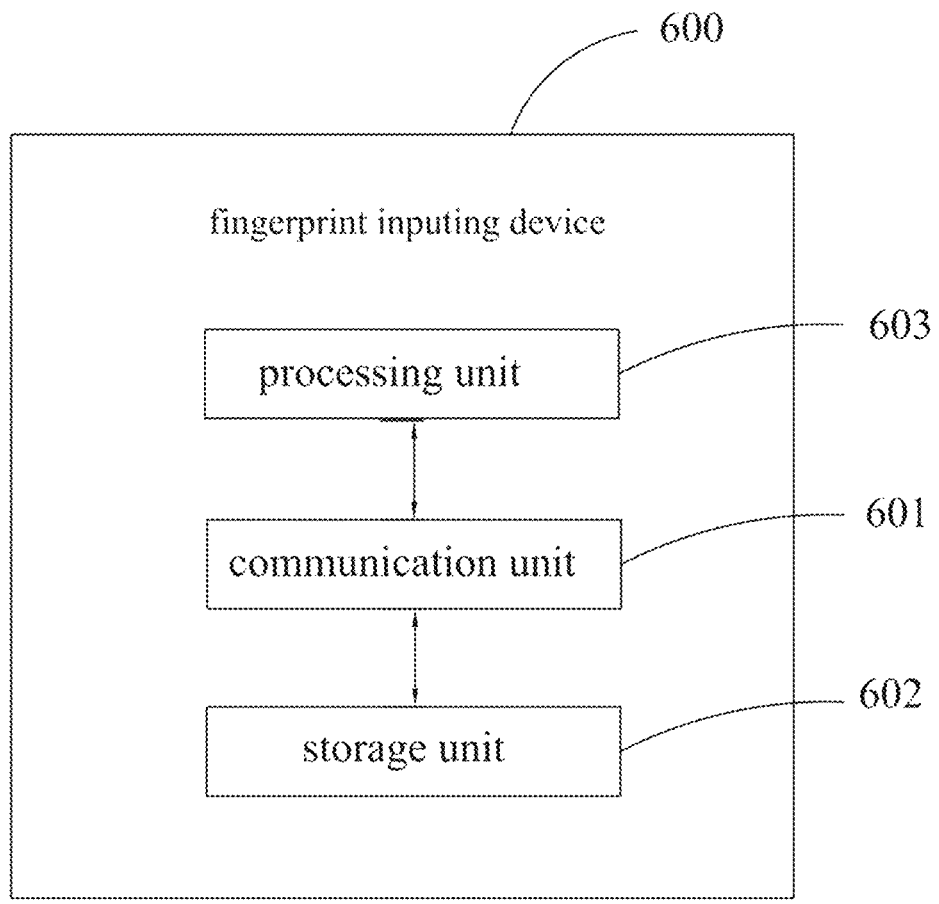
FIG. 6 is a functional block diagram of a fingerprint inputting device according to an embodiment of the present disclosure.

Please refer to FIG. 6. FIG. 6 is a functional block diagram of a fingerprint inputting device 600 according to an embodiment of the present disclosure. The fingerprint inputting device 600 is used in an electronic device. The electronic device comprises a display screen and an under-screen fingerprint, module corresponding to a predetermined region corresponding to the display screen. The fingerprint inputting device 600 comprises a processing unit 601 and a communication unit 602.

The processing unit 601 is configured to display a setting interface for fingerprint input on the display screen by the communication unit, wherein the setting interface for fingerprint input comprises a button of adding fingerprint function. The processing unit 601 is further configured to obtain at least one screen image by the under-screen fingerprint module while a user finger s not pressing a fingerprint identification region in response to detecting an instruction on the button of adding fingerprint function; wherein the fingerprint identification region comprises the predetermined region. The processing unit 601 is further configured to display a guiding interface of fingerprint input on the display screen and obtain a plurality of fingerprint images while the user finger s pressing the fingerprint identification region by the under-screen fingerprint module. In addition, the processing unit 601 is further to generate a fingerprint model to complete a fingerprint inputting process according to the at least one screen image and the plurality of fingerprint images.

The fingerprint inputting device 600 could further comprise a storage unit 603, configured to store program codes and data of the electronic device. The processing unit 601 could be a processor. The communication unit 602 could be an internal communication interface. The storage unit 603 could be a memory.

In an embodiment, the electronic device comprising a display screen and an under-screen fingerprint module corresponding to a predetermined region of the display screen. The electronic device first displays a setting interface for fingerprint input on the display screen, wherein the setting interface for fingerprint input comprises a button of adding fingerprint function. Then, the electronic device, in response to detecting an instruction on the button of adding fingerprint function, obtains at least one screen image by the under-screen fingerprint module while a user finger is not pressing a fingerprint identification region, wherein the fingerprint identification region comprises the predetermined region. And then, the electronic device displays a guiding interface of fingerprint input on the display screen and obtains a plurality of fingerprint images while the user finger is pressing the fingerprint identification region by the under-screen fingerprint module. Finally, the electronic device generates a fingerprint model to complete a fingerprint inputting process according to the at least one screen image and the plurality of fingerprint images. From the above, it could be understood that the electronic device could collect the screen images when the user finger does not press the fingerprint identification region and merges later-collected multiple fingerprint images to generate the fingerprint model. Because the real-time collected screen images could truly reflect the cleanness of the screen during the fingerprint inputting process, the electronic device could filter out the noise factor through the screen images. In this way, the electronic device could have a better accuracy of fingerprint inputting process and reduce the FRR of the fingerprint identification.

According to the above embodiment of the present disclosure, the at least one screen image comprises a plurality of screen images. The processing unit 601 is further configured to perform operations comprising: generating a reference image for filtering out a noise factor according to the at least one screen image, wherein the noise factor comprises a non-fingerprint information of the predetermined region and the non-fingerprint information comprises at least one of a dirty stain and a foreign object; obtaining a reference fingerprint image by filtering out a noise factor from each of the plurality of fingerprint images according to the reference image; and generating the fingerprint model according to a fingerprint model algorithm and a plurality of the reference fingerprint images.

According to the above embodiment of the present disclosure, the at least one screen image comprises only one screen image. The processing unit 601 is further configured to perform operations comprising: determining a reference image for filtering out a non-fingerprint information of the predetermined region and the non-fingerprint information comprises at least one of a dirty stain and a foreign object; obtaining a reference fingerprint image by filtering out a noise factor from each of the plurality of fingerprint images according to the reference image; and generating the fingerprint model according to a fingerprint model algorithm and a plurality of the reference fingerprint images.

According to the above embodiment of the present disclosure, the operation of generating the fingerprint model according to the fingerprint model algorithm and the plurality of the reference fingerprint images comprises: obtaining a minutiae information from the plurality of reference fingerprint images; obtaining standard minutiae data by processing the minutiae information by an algorithm of obtaining minutiae; and generating the fingerprint model according to the standard minutiae data.

According to the above embodiment of the present disclosure, the operation of generating the fingerprint model according to the fingerprint model algorithm and the plurality of the reference fingerprint images comprises: dividing the plurality of reference fingerprint images into a plurality of image sets, each image set comprising a reference fingerprint image or at least two reference fingerprint images, a similarity between the at least two reference fingerprint images is greater than a first predetermined threshold, a similarity between two reference fingerprint images in two image sets is smaller than a second predetermined threshold; deleting at least one duplicated image from the plurality of image sets such that each of the plurality of image sets only has one reference fingerprint image; Obtaining minutiae information from the reference fingerprint image retained in each of the plurality of image sets; generating standard minutiae data according to the minutiae information corresponding to the plurality of image sets; and generating the fingerprint model according to the standard minutiae data.

According to the above embodiment of the present disclosure, the operation of obtaining the reference fingerprint image by filtering out the noise factor from each of the plurality of fingerprint images according to the reference image comprises: performing an image characteristic comparison between the reference image and each of the fingerprint images to determine a noise image characteristic and a background image characteristic; and obtaining the reference fingerprint image by updating each of the fingerprint images according to the noise image characteristic and the background image characteristic.

According to the above embodiment of the present disclosure, the operation of obtaining the plurality of fingerprint images while the user finger is pressing the fingerprint identification region by the under-screen fingerprint module comprises: sequentially displaying, in the guiding interface of fingerprint input, a plurality of gesture guiding information in a predetermined guiding information set and obtaining at least one fingerprint image while the user finger is pressing the fingerprint identification region during a display process of each of the gesture guiding information by the under-screen fingerprint module to obtain the plurality of fingerprint images.

According to an embodiment of the present disclosure, a computer readable storage medium is disclosed. The computer readable storage medium is configured to store a computer program for electronic data exchange. The computer program could be executed by a computer to perform any one or more steps of the method of the above-mentioned embodiments. The computer includes the electronic device.

According to an embodiment of the present disclosure, a computer program product is disclosed. The computer program product comprises a non-volatile computer readable storage medium storing a computer program. The computer program could be executed by a computer to perform any one or more steps of the method of the above-mentioned embodiments. The computer program product could be a software installation package. The computer includes the electronic device.

It should be noted that for the foregoing method embodiments, for the sake of simple description, they are all expressed as a series of action combinations, but those skilled in the art should know that this disclosure is not subject to the described sequence of actions. The limitation is because according to this disclosure, some steps can be performed in other order or at the same time. Secondly, those skilled in the art should also know that the embodiments described in the specification are all preferred embodiments, and the actions and modules involved are not necessarily required by this disclosure.

In the above-mentioned embodiments, the description of each embodiment has its own focus. For parts that are not described in detail in an embodiment, reference may be made to related descriptions of other embodiments.

It should be understood that the disclosed device may be implemented in other ways. For example, the device embodiments described above are only illustrative. For example, the division of the above-mentioned units is only a logical function division, and there may be other divisions in actual implementation, for example, multiple units or components can be combined or integrated. To another system, or some features can be ignored, or not implemented. In addition, the displayed or discussed mutual coupling or direct coupling or communication connection may be indirect coupling or communication connection through some interfaces, devices or units, and may be in electrical or other forms.

The units described above as separate components may or may not be physically separated, and the components displayed as units may or may not be physical units, that is, they may be located in one place, or they may be distributed in multiple network units located in different locations. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated in one unit. The above-mentioned integrated unit can be implemented in the form of hardware or software functional unit.

If the aforementioned integrated unit is implemented in the form of a software functional unit and sold or used as an independent product, it can be stored in a computer readable memory. Based on this understanding, the technical solution of the present disclosure essentially or the part that contributes to the existing technology or all or part of the technical solution can be embodied in the form of a software product, and the computer software product is stored in a memory. A number of instructions are included to enable a computer device (which may be a personal computer, a server, or a network device, etc.) to execute all or part of the steps of the foregoing methods of the various embodiments of the present disclosure. The aforementioned memory includes: USB disk, Read-Only Memory (ROM), Random Access Memory (RAM), mobile hard disk, magnetic disk, or optical disk and other media that can store program codes.

Those of ordinary skill in the art can understand that all or part of the steps in the various methods of the above-mentioned embodiments can be completed by instructing relevant hardware through a program. The program can be stored in a computer-readable memory, and the memory includes: Flash disk, read-only memory (ROM), random access device (RAM), magnetic disk or CD, etc.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A fingerprint inputting method for an electronic device, comprising:
    displaying a setting interface of fingerprint input on a display screen, wherein the setting interface of fingerprint input comprises a button of adding fingerprint function;
    in response to detecting an instruction on the fingerprint adding function button, obtaining at least one screen image by the under-screen fingerprint module while a user finger is not pressing a fingerprint identification region, wherein fingerprint identification region comprises a predetermined region;
    displaying a guiding interface of fingerprint input on the display screen and obtaining a plurality of fingerprint images while the user finger is pressing the fingerprint identification region by the under-screen fingerprint module; and
    generating a fingerprint model according to the at least one screen image and the plurality of fingerprint images;
    wherein the at least one screen image comprises only one screen image and the generating the fingerprint model according to the at least one screen image and the plurality of fingerprint images comprises:
        determining a reference image for filtering out a non-fingerprint information of the predetermined region and the non-fingerprint information comprises at least one of a dirty stain and a foreign object;
        obtaining a reference fingerprint image by filtering out a noise factor from each of the plurality of fingerprint images according to the reference image; and
        generating the fingerprint model according to a fingerprint model algorithm and a plurality of the reference fingerprint images.

2. The method of claim 1, wherein the generating the fingerprint model according to the fingerprint model algorithm and the plurality of the reference fingerprint images comprises:
    obtaining a minutiae information from the plurality of reference fingerprint images;
    obtaining standard minutiae data by processing the minutiae information by an algorithm of obtaining minutiae; and
    generating the fingerprint model according to the standard minutiae data.

3. The method of claim 1, wherein the generating the fingerprint model according to the fingerprint model algorithm and the plurality of the reference fingerprint images comprises:
    dividing the plurality of reference fingerprint images into a plurality of image sets, each image set comprising a reference fingerprint image or at least two reference fingerprint images, wherein a similarity between the at least wo reference fingerprint images is greater than a first predetermined threshold, and a similarity between two reference fingerprint images in two image sets is smaller than a second predetermined threshold;
    deleting at least one duplicated image from the plurality of image sets, each of the plurality of image sets only having one reference fingerprint image;
    obtaining minutiae information from the reference fingerprint image retained in each of the plurality of image sets;
    generating standard minutiae data according to the minutiae information corresponding to the plurality of image sets; and
    generating the fingerprint model according to the standard minutiae data.

4. The method of claim 1, wherein the obtaining the reference fingerprint image by filtering out the noise factor from each of the plurality of fingerprint images according to the reference image comprises:
    performing an image characteristic comparison between the reference image and each of the fingerprint images, and determining a noise image characteristic and a background image characteristic; and obtaining the reference fingerprint image by updating each of the fingerprint images according to the noise image characteristic and the background image characteristic.

5. The method of claim 4, wherein the obtaining the plurality of fingerprint images while the user finger is pressing the fingerprint identification region by the under-screen fingerprint module comprises:
sequentially displaying, in the guiding interface of fingerprint input, a plurality of gesture guiding information in a predetermined guiding information set; and
during a process of displaying each of the gesture guiding information, obtaining at least one fingerprint image while the user finger is pressing the fingerprint identification region by the under-screen fingerprint module.

6. The method of claim 5, wherein the guiding information set comprises predetermined posture informing information for informing a user to press the fingerprint identification region by different finger postures.

7. The method of claim 6, further comprising:
determining a position of the noise factor according to the screen image and outputting a message of informing the user to clean the display screen; and
informing the user to input the fingerprint after confirming that there is no noise factor by repeatedly obtaining the screen image.

8. An electronic device comprising:
a display screen, configured to display a setting interface of fingerprint input comprising a button of adding fingerprint function and to display a guiding interface of fingerprint input;
an under-screen fingerprint module corresponding to a predetermined region of the display screen, configured to obtain at least one screen image while a user finger is not pressing a fingerprint identification region in response to detecting an instruction on the fingerprint adding function, and configured to obtain a plurality of fingerprint images while the user finger is pressing the fingerprint identification region, wherein the fingerprint identification region comprises the predetermined region;
a processor;
a memory, storing one or more programs executable by the processor to perform at least one operation comprising:
generating a fingerprint model according to the at least one screen image and the plurality of fingerprint images;
wherein the at least one screen image comprises only one screen image and the generating the fingerprint model comprises:
determining a reference image for filtering out a non-fingerprint information of the predetermined region and the non-fingerprint information comprises at least one of a dirty stain and a foreign object;
obtaining a reference fingerprint image by filtering out a noise factor from each of the plurality of fingerprint images according to the reference image; and
generating the fingerprint model according to a fingerprint model algorithm and a plurality of the reference fingerprint images.

9. The fingerprint inputting device of claim 8, wherein the generating the fingerprint model according to the fingerprint model algorithm and the plurality of the reference fingerprint images comprises:
obtaining a minutiae information from the plurality of reference fingerprint images;
obtaining standard minutiae data by processing the minutiae information by an algorithm of obtaining minutiae; and
generating the fingerprint model according to the standard minutiae data.

10. The fingerprint inputting device of claim 8, wherein the generating the fingerprint model according to the fingerprint model algorithm and the plurality of the reference fingerprint images comprises:
dividing the plurality of reference fingerprint images into a plurality of image sets, each image set comprising a reference fingerprint image or at least two reference fingerprint images, a similarity between the at least two reference fingerprint images is greater than a first predetermined threshold, a similarity between two reference fingerprint images in two image sets is smaller than a second predetermined threshold;
deleting at least one duplicated image from the plurality of image sets, each of the plurality of image sets only having one reference fingerprint image;
obtaining minutiae information from the reference fingerprint mage retained in each of the plurality of image sets;
generating standard minutiae data according to the minutiae information corresponding to the plurality of image sets; and
generating the fingerprint model according to the standard minutiae data.

11. The fingerprint inputting device of claim 8, wherein the obtaining the reference fingerprint image by filtering out the noise factor from each of the plurality of fingerprint images according to the reference image comprises:
performing an image characteristic comparison between the reference image and each of the fingerprint images to determine a noise image characteristic and a background image characteristic; and
obtaining the reference fingerprint image by updating each of the fingerprint images according to the noise image characteristic and the background image characteristic.

12. The fingerprint inputting device of claim 11, wherein the display screen is configured to sequentially display, in the guiding interface of fingerprint input, a plurality of gesture guiding information in a predetermined guiding information set; and
the under-screen fingerprint module is further configured to obtain the plurality of fingerprint images while the user finger is pressing the fingerprint identification region in response to each of the gesture guiding information.

13. The fingerprint inputting device of claim 12, wherein the guiding information set comprises predetermined posture informing information for informing a user to press the fingerprint identification region by different finger postures.

14. The fingerprint inputting device of claim 13, wherein the display screen is configured to display a message of informing the user to clean the display screen in response to determining a position of the noise factor according to the screen image, and is configured to inform the user to input the fingerprint after confirming that there is no noise factor by repeatedly obtaining the screen image.

15. A non-transitory computer-readable storage medium storing computer procedures for electronic data interchange, wherein the computer procedures are executable by a computer to perform at least one operation comprising:
generating a fingerprint model according to at least one screen image and a plurality of fingerprint images;

wherein the at least one screen image is obtained by an under-screen fingerprint module while a user finger is not pressing a fingerprint identification region in response to detecting an instruction on a button of adding fingerprint function that is displayed on a display screen of the computer;

wherein a plurality of fingerprint images are obtained by the under-screen fingerprint module while the user finger is pressing a fingerprint identification region of the display screen;

wherein the fingerprint identification region corresponds to the under-screen fingerprint module; and wherein the computer procedures are executable by the computer to perform:
- generating a reference image for filtering out a noise factor according to the at least one screen image, wherein the noise factor comprises a non-fingerprint information of the predetermined region and the non-fingerprint information comprises at least one of a dirty stain and a foreign object;
- obtaining a reference fingerprint image by filtering out a noise factor from each of the plurality of fingerprint images according to the reference image; and
- generating the fingerprint model according to a fingerprint model algorithm and a plurality of the reference fingerprint images.

* * * * *